United States Patent [19]
Phillips et al.

[11] Patent Number: 5,735,499
[45] Date of Patent: Apr. 7, 1998

[54] GRIP HEAD

[75] Inventors: Edward Phillips; Thomas Pfeiffer, both of Burbank, Calif.

[73] Assignee: Matthews Studio Equipment, Inc., Burbank, Calif.

[21] Appl. No.: 627,703

[22] Filed: Mar. 29, 1996

[51] Int. Cl.$^6$ .................................................. A47B 96/06
[52] U.S. Cl. ............................... 248/230.1; 248/316.4; 248/291.1; 248/292.12
[58] Field of Search ........................... 248/125.1, 230.1, 248/316.4, 316.6, 291.1, 292.12, 286.1

[56] References Cited

U.S. PATENT DOCUMENTS

| | | | |
|---|---|---|---|
| D. 286,741 | 11/1986 | Clauss | 248/125.1 X |
| 2,622,831 | 12/1952 | Fullwood | 248/292.12 |
| 2,692,106 | 10/1954 | Herrmann | 248/291.1 X |
| 2,733,035 | 1/1956 | Rocheleau | 248/286.1 X |
| 4,747,569 | 5/1988 | Hoshino | 248/291.1 |
| 4,949,928 | 8/1990 | Hoshino | 248/291.1 |
| 4,958,793 | 9/1990 | Hess | 248/316.6 X |
| 5,069,416 | 12/1991 | Ennis | 248/292.12 X |
| 5,566,911 | 10/1996 | Hoshino | 248/316.4 X |

*Primary Examiner*—Daniel P. Stodola
*Assistant Examiner*—Gregory J. Strimbu
*Attorney, Agent, or Firm*—Michael A. Painter

[57] ABSTRACT

A coupling for mounting and positioning photographic, motion picture and video accessories and the like. A mounting sleeve is adapted to be secured to an equipment supporting member. A fixed positioning disc depends from and is integral with the mounting sleeve. A cylindrical shaft is axially coupled to and extends from the fixed positioning disc. A first rotatable positioning disc is disposed about the cylindrical shaft, a frictional stabilizing member being disposed between the fixed positioning disc and the first rotatable positioning disc. A second rotatable positioning disc is annularly disposed about the cylindrical shaft in proximity to the first rotatable positioning disc. The adjacent surfaces of the first and second rotatable positioning discs have disposed therein reciprocally aligned pairs of linear channels of varying width and depth, each pair of linear channels being adapted to receive and secure equipment supporting shafts of differing cross section. A securing handle is coupled to the cylindrical shaft and is adapted to impose an axial force to engage the rotatable discs and thereby securely position each pair of aligned, linear channels at any position along a 360° arc relative to the axis of the mounting sleeve.

9 Claims, 2 Drawing Sheets

GRIP HEAD

BACKGROUND OF THE INVENTION

1. Field of the Invention

The present invention generally relates to mechanical coupling devices, and more particularly to coupling apparatus used to positionally support photographic, motion picture and video accessories.

2. Prior Art

As the photographic, motion picture and television industries have evolved and developed, demand for equipment which is capable of enhancing the final product has increased. This has led to the use of accessories which are integral and necessary to the filming and/or recording of visual and audible images. These accessories are, for example, such items as light reflectors, filters and microphones. The effective use of these accessories requires that they be placed in precisely the correct location to permit optimum recording of visual images and/or sounds.

The prior art exhibits numerous classes and types of equipment to support and mount photographic and sound accessories. The most basic designs require each accessory to be mounted individually. Each accessory is required to be individually placed adjacent the visual scene or audio source involved. Even if the accessory may be positioned upon the supporting device, the inherent nature of the design renders it inadequate. In addition, in many situations accessories must be used in environments having limited available space. This substantially limits the manner of use of each accessory and adversely affects the final product.

Another design exhibited by the prior art permits a plurality of accessories to be mounted or otherwise supported upon an individual stand or pedestal. Although this tends to resolve the problem created by spatial limitations, it fails to address the need to provide positional flexibility of each accessory.

The present invention substantially resolves those problems inherent in the designs disclosed by the prior art. The grip head is adapted to be coupled to a stanchion which generally constitutes a vertically disposed support incorporated within a conventional stand or pedestal used by the photographic, motion picture and television industries. A typical stand employs a stable tripod upon which a stanchion is vertically extended. The present invention is adapted to be secured to the vertical stanchion and to positionally mount accessories thereto.

The present invention grip head includes a mounting sleeve which is adapted to be vertically positioned upon a stanchion of a conventional pedestal or stand and secured thereto at a selected, vertical height. A fixed disc depends outwardly from the mounting sleeve. A threaded, cylindrical shaft is axially coupled to the fixed disc and is disposed perpendicular to the axis of orientation of the mounting sleeve. The surface of the fixed disc opposed to the mounting sleeve is a planar surface which is perpendicular to the cylindrical shaft. First and second rotatable discs are annularly disposed about the cylindrical shaft, the adjacent surfaces of the first and second rotatable discs having a plurality of pairs of equal and opposite linear, receiving channels disposed therein, each pair of mating linear channels being adapted to receive an equipment supporting shaft having a varying cross-section. A threaded handle is mated upon the threaded cylindrical shaft and imposes an axial force upon the second rotatable disc engaging the adjacent surfaces of the rotatable discs and securing the position of mounted equipment shaft and accessory relative to the fixed disc. When the force imposed by the threaded handle is released, the rotatable discs may be rotated a full 360° of arc relative to the mounting sleeve thereby permitting full flexibility in locating the photographic, motion picture and video accessories relative to a supporting equipment stand.

SUMMARY OF THE INVENTION

The present invention generally relates to a positioning apparatus used to position and secure photographic, motion picture and video accessories to a vertically oriented stanchion mounted upon a conventional equipment stand or pedestal. The present invention positional apparatus is generally referred to by the trade as a grip head. Although the present invention will be described in connection with a vertical stanchion, it is understood the scope of the present invention is independent of the orientation of the supporting member to which it is coupled.

A mounting sleeve is adapted to be disposed about and vertically attached to a stanchion at any desired height. A fixed cylindrical disc depends from the outer surface of the receiving sleeve. A partially threaded cylindrical shaft is secured to the fixed cylindrical disc along the axis thereof. The surface of the fixed cylindrical disc in opposition to the mounting sleeve is a planar surface which is perpendicular to the axis of the cylindrical shaft. A pair of cylindrical rotatable discs are slidably disposed about the cylindrical shaft. The axial surface of the rotatable disc adjacent the fixed disc is a planar surface in parallel spaced relation to the fixed disc. A frictional member is disposed intermediate the axial surface of the fixed disc and adjacent rotatable disc to aid in securing the position of a mounted accessory.

The adjacent surfaces of the rotatable discs have a plurality of aligned, linear channels disposed in the surfaces thereof defining chords in communication with the cylindrical surface of the discs. Each pair of aligned linear channels are adapted to receive an equipment support shaft on which an accessory is mounted. A portion of the outer surface of the cylindrical shaft is threaded. A handle having a threaded aperture disposed therethrough is engaged with the threaded portion of the cylindrical shaft and rotated until the rotatable discs are firmly seated between the threaded handle and the fixed disc thereby orienting an equipment supporting shaft at any angle relative to the mounting sleeve and stanchion.

It is an object of the present invention to provide an improved grip head for positioning photographic, motion picture and video accessories.

It is another object of the present invention to provide an improved grip head which can position and secure mounted accessories along 360° of circular arc relative to an equipment support stand.

It is still another object of the present invention to provide an improved grip head which may secure and position equipment support shaft having varying cross-sectional profiles.

It is still yet another object of the present invention to provide an improved grip head which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figure 1:
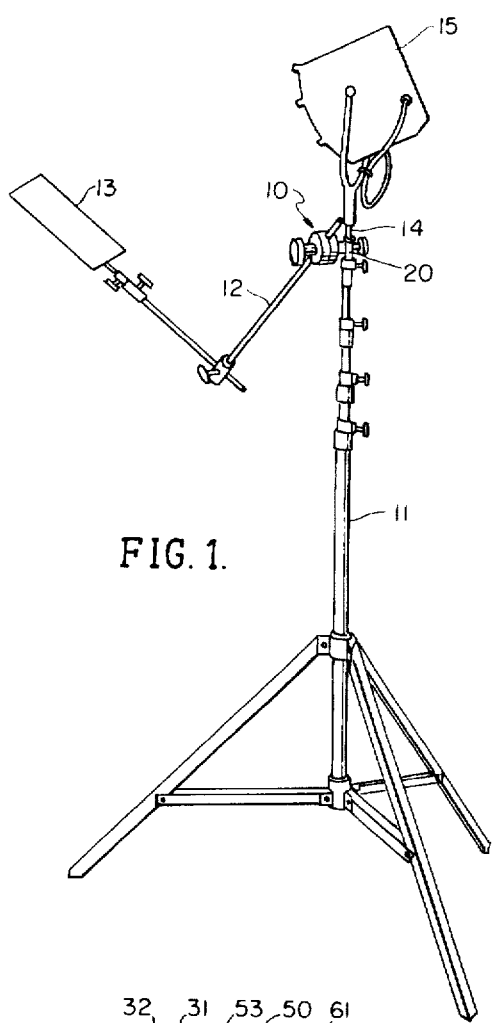
FIG. 1 is a perspective view of the present invention grip head mounted upon an equipment support stand and positioning a photographic accessory relative thereto.
Figure 5:
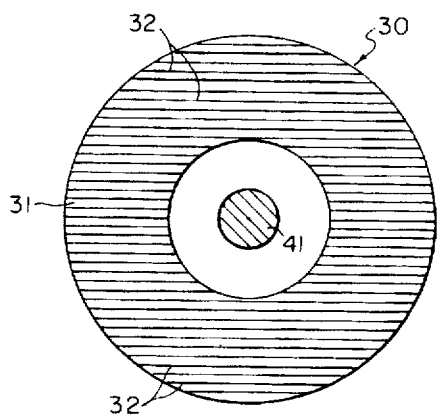
FIG. 5 is a plan view of the serrated surface of the fixed disc shown in FIG. 2 taken at line 5—5 of FIG. 2.
Figure 6:
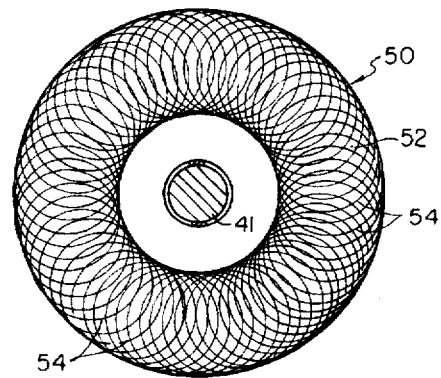
FIG. 6 is a plan view of the serrated surface of a rotatable disc shown in FIG. 2 taken at line 6—6 of FIG. 2.

An understanding of the present invention may be best gained by referenced to FIG. 1 wherein the present invention grip head is generally designated by the reference numeral 10. The present invention is employed for the purpose of adjustably securing and positioning photographic, motion picture and video accessories. For the purpose of example only, grip head 10 is used in conjunction with a conventional equipment stand 11 which does not form a part of the present invention. Grip head 10 is shown coupled to and positioning an exemplary equipment support shaft 12 which in turn is coupled to a theatrical accessory such as a light filter 13. For the purpose of example only, grip head 10 is coupled to the upper stanchion 14 of equipment stand 11, the assembly also illustrating for example the mounting of theatrical lighting 15. Although grip head 10 is shown to be coupled to a stanchion 14 which is vertically oriented, it is understood the scope of the present invention is independent of the positional orientation of the stand or pedestal with which grip head 10 is utilized.

Figure 2:
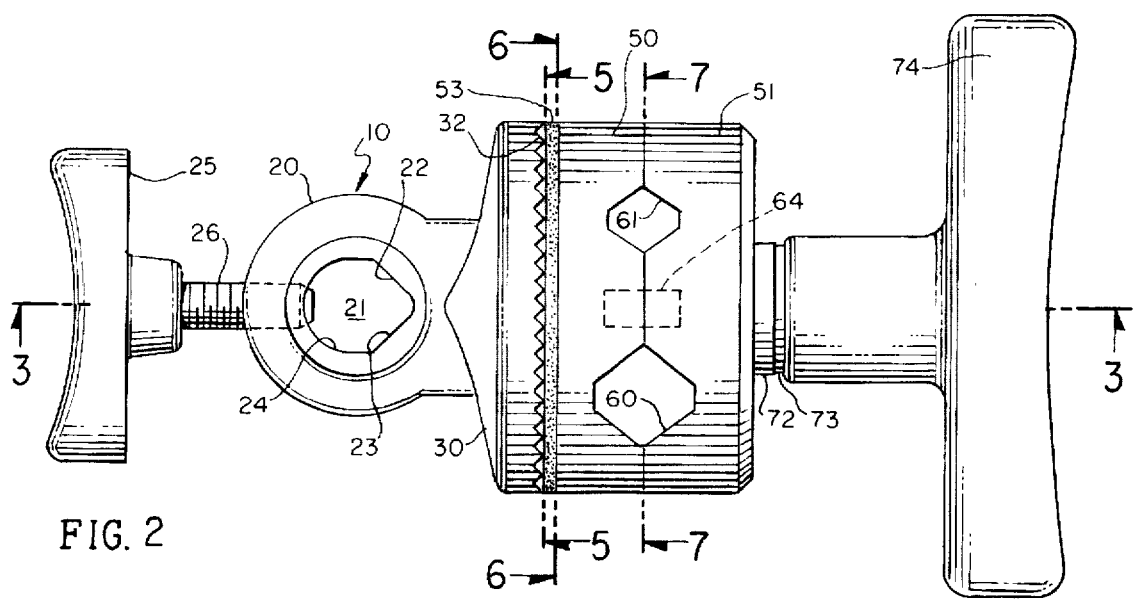
FIG. 2 is a top plan view of the present invention grip head shown in FIG. 1.
Figure 3:
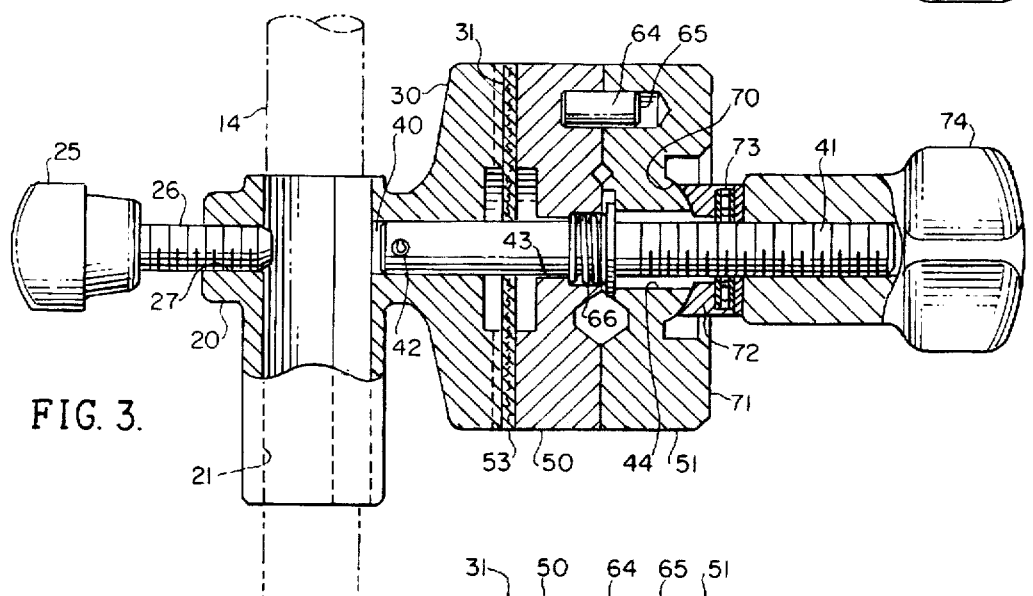
FIG. 3 is a first side elevation, partial cross-sectional view of the present invention shown in FIG. 2 taken through line 3—3 of FIG. 2 illustrating the present invention mounted upon a vertical stanchion.
Figure 4:
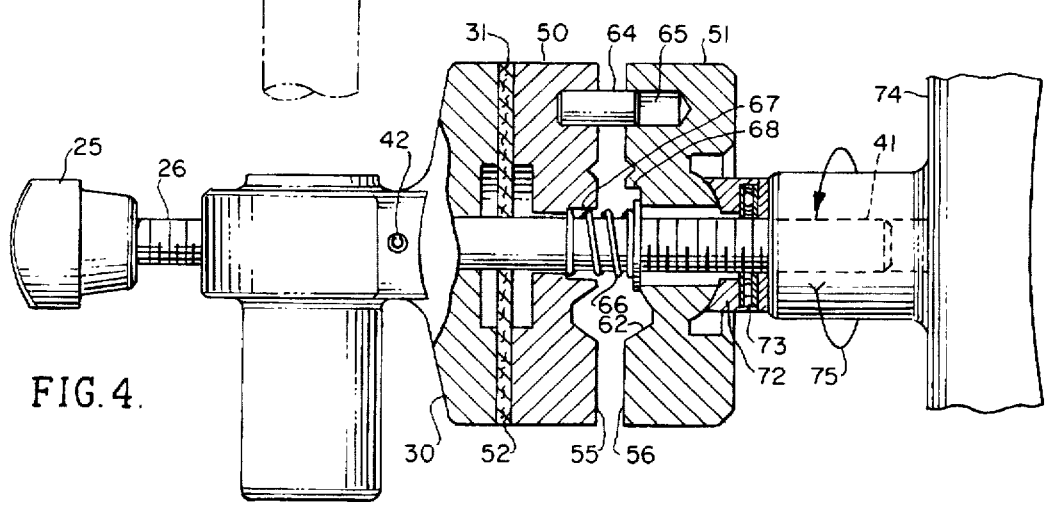
FIG. 4 is a second side elevation, partial cross-sectional view illustrating the rotatable, positioning discs used to mount equipment supporting shafts.

The structure of grip head 10 may be best understood by reference to FIGS. 2–8, inclusive. As stated hereinabove, it is an object of the present invention to provide a positioning apparatus which permits flexible positioning of mounted photographic, motion picture and video accessories. The overall assembly of grip head 10 is illustrated in FIGS. 2, 3 and 4. Mounting sleeve 20 is used to couple the present invention grip head 10 to stanchion 14. To couple grip head 10 to stanchion 14, a longitudinal bore 21 is disposed through mounting sleeve 20. Although bore 21 may be cylindrical in cross-section, the preferred embodiment of the present invention incorporates a pair of surfaces 22 and 23 which are perpendicular to each other (see FIG 2 ) to act in conjunction with semi-cylindrical surface 24. Stanchion 14 is typically a cylindrical shaft and is adapted to be disposed through bore 21. Locking member 25 includes a threaded shaft 26. An aperture 27 is disposed through the wall of mounting sleeve 20 in a radial relationship to the axis of bore 21 and semi-cylindrical surface 24. Aperture 27 is threaded to mate with threaded shaft 26. As can be seen best in FIG. 3, locking member 25 bears against stanchion 14 forcing it adjacent perpendicular surfaces 22 and 23 thereby securely locking stanchion 14 in a selected position relative to mounting sleeve 20.

Cylindrical fixed positioning disc 30 extends outwardly from the wall of mounting sleeve 20 in diametric opposition to locking member 25. Fixed positional disc 30 incorporates a generally planar surface 31 which is in parallel spaced relation to the axis of bore 21. As can be best seen in FIGS. 2 and 5, surface 31 of fixed positional disc 30 is inscribed with a plurality of parallel ridged serrations 32. As will be explained in detail hereinbelow, ridged serrations 32 allow grip head 10 to securely maintain the position of equipment support shaft 12 even when an accessory of substantial weight is mounted thereto.

It is an object of the present invention to provide the means for mounting an equipment support shaft 12 and position and secure shaft 12 at any location along 360° of arc. To meet this objective, an axial aperture 40 is disposed through surface 31 of fixed positional disc 30. A cylindrical shaft 41 is disposed within aperture 40 and secured thereto with a conventional rivet 42. Although the preferred embodiment of the present invention illustrates securing shaft 41 to fixed positional disc 30 through the use of a rivet 42, it is understood other conventional methods to secure and/or integrate cylindrical shaft 41 may be employed.

Figure 8:
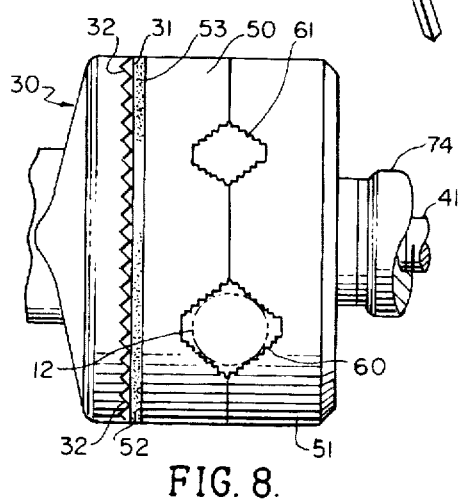
FIG. 8 is a side elevation view of a pair of the engaged linear channels of the rotatable discs shown in FIG. 2.
Figure 7:
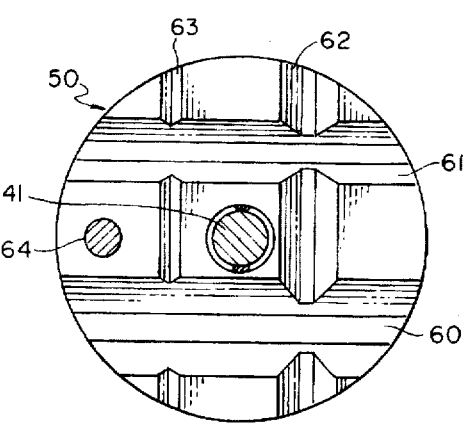
FIG. 7 is an enlarged, cross-sectional view of an engagement surface of a rotatable disc shown in FIG. 2 taken through line 7—7 of FIG. 2.

The structure used to mount an equipment support shaft 12 may be best seen by reference to FIGS. 3, 4 and 8. In order to secure an equipment support shaft 12, grip head 10 employs a pair of rotatable positioning discs 50 and 51 having apertures 43 and 44 axially formed therein, discs 50 and 51 being slidably disposed about cylindrical shaft 41. Positional disc 50 is axially adjacent fixed disc 30, exterior surface 52 of rotatable disc 50 being separated from surface 31 of fixed positional disc 30 by a malleable member 53 such as a gasket fabricated of fiber or aluminum. As can be best seen in FIG. 6, surface 52 has inscribed therein a plurality of wholly or partially circular serrations 54 which are adapted to engage malleable gasket 53 (FIG. 8). As will be described in detail hereinbelow, when the present invention grip head 10 is in a locked position securing an equipment support shaft 12, the ridged serrations 32 of fixed positional disc 30 and the circular serrations 54 of rotatable positional disc 50 will firmly engage malleable gasket 53. The combination of the frictional properties of gasket 53 and the gripping qualities of ridged serrations 32 and circular serrations 54 will preclude any inadvertent rotational movement of rotatable positional disc 50 relative to fixed positional disc 30.

As stated hereinabove, it is an object of the present invention to provide means for securing an equipment support shaft 12 which may vary in cross-sections. For the purpose of example only, the present invention grip head 10 will be discussed with reference to cylindrical support shaft 12. The adjacent surfaces 55 and 56 of positing discs 50 and 51, respectively, have formed therein a plurality of reciprocal, aligned linear channels of differing widths and depths which are designated as gripping channels 60, 61, 62 and 63 (see FIG. 7). Each of the gripping channels are geometrically disposed as chords intersecting the outer circumference of the rotatable positing discs 50 and 51, the channels being spaced from the axial disposed shaft 41. Although the profile of gripping channels 60–63 need only be sufficient to grip support shaft 12 when surfaces 52 and 53 are engaged, the preferred embodiment of the present invention incorporates sequentially beveled steps (FIG. 8) in order to enhance the ability to preclude inadvertent rotational movement of shaft 12 which could be caused by the weight of a mounted accessory.

In order to insure the proper alignment of the relative gripping channels formed in surfaces 55 and 56 of positioning discs 50 and 51, a guide pin 64 is coupled to positing disc 50 perpendicular to surface 55. An appropriately positioned receiving detent 65 is disposed into surface 56 of positing disc 51 to receive guide pin 64 thereby aligning each half of each gripping channel 60–63, inclusive, formed in surfaces 55 and 56.

For the purpose of example, FIG. 8 illustrates equipment support shaft 12 secured within gripping channel 60. The means used to facilitate the insertion and removal of a support shaft 12 may be best seen in FIG. 3 and FIG. 4. To provide for easy separation of surfaces 55 and 56 for removal of support shaft 12, a helical spring and support flange 66 are disposed about cylindrical shaft 41 adjacent recessed apertures 67 and 68 formed in the surfaces 55 and 56 of positioning discs 50 and 51, respectively. As will be described in detail herein-below, when positioning discs 50 and 51 are forced adjacent one another as shown in FIG. 8, helical spring 66 will be compressed (FIG. 3) and gripping channels being positioned to firmly secure a support shaft 12 (FIG. 8). When the force maintaining positional discs 50 and 51 in adjacent positions is released, helical spring 66 will expand (FIG. 4) thereby permitting removal of support shaft 12.

In order to securely lock an equipment support shaft 12 in place, means are provided to impose a uniform axial force against rotatable positioning disc 51 urging it toward positioning disc 50. The structure used to exert the uniform axial force may be best seen by reference to FIGS. 3 AND 4. A partially spherical surface 70 is formed in outer surface 71 about the longitudinal axis of aperture 44. A thrust washer 72 is disposed about cylindrical shaft 41 and placed in abutment with spherical surface 70. A conventional needle thrust washer assembly 73 is disposed about cylindrical shaft 41 and placed adjacent the exterior surface of thrust washer 72. A threaded locking flange 74 engages mating threads on cylindrical shaft 41 and rotated in the direction identified by reference numeral 75 in order to engage rotatable positioning discs 50 and 51 and secure support shaft 12 in the manner shown in FIG. 8.

As stated hereinabove, the primary objective of the present invention is to provide means for coupling a photographic, motion picture or television accessory to an equipment stand 11 and provide a capability to position the accessory anywhere along 360° of arc. In operation, to secure equipment support shaft 12 to grip head 10, locking flange 74 is rotated contrary to reference numeral 75 to release the axial force imposed upon positioning disc 51. Helical spring 66 will expand permitting the insertion of equipment support shaft 12. Upon the removal of axial force from rotatable positioning disc 51, rotatable disc 50 may be rotated relative to mounting sleeve 20 a full 360° of arc. When the appropriate position of rotatable positional disc 50 and 51 and equipment support shaft has been selected, locking flange 74 is rotated in the direction indicated by reference numeral 75 locking equipment support shaft 12 in place relative to mounting sleeve 20 and stanchion 14.

We claim:

1. A grip head for coupling an equipment support shaft to a stanchion comprising:

(a) a mounting sleeve adapted to be coupled to the stanchion, said mounting sleeve having an elongated bore disposed therethrough for receiving the stanchion, said bore having first and second substantially perpendicular surface adapted to engage the stanchion;

(b) a fixed positioning member having a planar surface having parallel serrated ridges disposed therein, said fixed positioning member being coupled to and extending from said mounting sleeve;

(c) a cylindrical shaft being coupled to said fixed positioning member perpendicular to the planar surface thereof;

(d) a first rotatable positioning member being slidably coupled about the cylindrical shaft, said first rotatable positioning member having first and second opposed planar gripping surfaces in parallel spaced relation to each other and being perpendicular to the cylindrical shaft, said first gripping surface being in axial abutment to the planar surface of said fixed positioning member and having a plurality of arcuate serrated ridges disposed therein, said second gripping surface having first mounting means disposed therein for receiving and securing the equipment support shaft;

(e) a second rotatable positioning member being slidably coupled about said cylindrical shaft and including a first planar gripping surface having second mounting means disposed therein for receiving and securing the support shaft, said second mounting means being aligned with the first mounting means disposed in said first rotatable positioning member, and a second planar surface axially opposed from said first planar gripping surface of said second rotatable positioning member; and (f) clamping means coupled to the cylindrical shaft for imposing an axial force against the second planar surface of said second rotatable positioning member causing the first and second mounting means to be aligned with one another for securing the equipment support shaft therebetween.

2. A grip head as defined in claim 1 wherein a fiber member having planar surfaces in parallel spaced relation with each other is disposed about the cylindrical shaft intermediate the fixed positioning member and said first rotatable positioning member.

3. A grip head as defined in claim 1 wherein said first mounting means includes an alignment pin secured to and extending outwardly from the second gripping surface in parallel spaced relation to the cylindrical shaft.

4. A grip head as defined in claim 3 wherein said second mounting means includes a receiving detent which is aligned with and adapted to receive said alignment pin.

5. A grip head for coupling an equipment support shaft to a stanchion comprising:

(a) an elongated mounting sleeve adapted to be coupled to the stanchion, said mounting sleeve having an elongated bore disposed therethrough for receiving the stanchion, said bore having first and second substantially perpendicular surfaces adapted to engage the stanchion;

(b) a cylindrical fixed positioning member extending outwardly from the mounting sleeve and having a planar surface parallel to the axis of the mounting sleeve, said planar surface having a plurality of parallel, serrated ridges disposed therein;

(c) a cylindrical shaft being coupled to the fixed positioning member perpendicular to the planar surface thereof;

(d) a first cylindrical rotatable positioning member having opposed first and second planar gripping surfaces in parallel spaced relation to each other, said first rotatable positioning member being slidably and axially coupled about the cylindrical shaft along the axis of said cylindrical shaft, said first gripping surface having a plurality of overlapping, arcuate serrated ridges disposed therein and being in axial abutment to the planar surface of said fixed positioning member, said second gripping surface having first mounting means disposed therein for receiving and securing the equipment support shaft;

(e) a second cylindrical rotatable positioning member being slidably and axially coupled about said cylindrical shaft and including a first planar gripping surface having second mounting means disposed therein for receiving and securing the support shaft, said second mounting means being aligned with the first mounting means disposed in the second gripping surface of said first rotatable positioning member, and a second planar surface axially opposed from said first planar gripping surface of said second rotatable positioning member; and (f) clamping means coupled to the cylindrical shaft adapted to impose an axial force against the second planar surface of said second rotatable positioning member whereby the first and second mounting means of said first and second rotatable positioning members, respectively, are aligned with one another for securing the equipment support shaft therebetween.

6. A grip head as defined in claim 5 wherein a malleable member having planar surfaces in parallel spaced relation with each other is disposed about the cylindrical shaft intermediate the fixed positioning member and said first rotatable positioning member.

7. A grip head as defined in claim 5 wherein said first and second mounting means disposed in said first and second rotatable positioning members respectively comprise a plurality of reciprocal, linear channels, each of which is adapted to receive equipment support shafts of differing cross-section.

8. A grip head for coupling an equipment support shaft to a stanchion, said grip head comprising:

(a) a mounting sleeve having an outer housing wall and a substantially cylindrical bore disposed therethrough, the stanchion adapted to be disposed within the cylindrical bore, said cylindrical bore having first and second substantially perpendicular surfaces adapted to engage the stanchion;

(b) means for securing the stanchion relative to the mounting sleeve coupled through the outer housing wall of the mounting sleeve;

(c) a cylindrical fixed positioning member extending outwardly from the outer housing wall of said mounting sleeve having a circular, planar surface in parallel spaced relation to the axis of the substantially cylindrical bore of said mounting sleeve, said planar surface having a plurality of parallel, serrated ridges disposed therein;

(d) a cylindrical shaft being coupled to the fixed positioning member perpendicular to and extending from the planar surface thereof;

(e) a first rotatable positioning member comprising a cylindrical body and substantially parallel first and second opposed planar gripping surfaces and having an aperture axially disposed therethrough from said first gripping surface to said second gripping surface, said first rotatable positioning member being rotatably mounted about the cylindrical shaft, the first gripping surface having a plurality of overlapping, arcuate serrated ridges disposed therein and being in axial abutment to the planar surface of said fixed positioning member, the second gripping surface having disposed therein a plurality of linear channels extending fully across the second gripping surface, each linear channel having a distinctive width and depth, the second gripping surface including an alignment pin extending outwardly therefrom in parallel spaced relation to the cylindrical shaft;

(f) a second rotatable positioning member comprising a cylindrical body and first and second end surfaces in parallel spaced relation to each other and an aperture disposed therethrough along the axis of said cylindrical body from the first end surface to the second end surface thereof, said second rotatable positioning member being rotatably mounted upon said cylindrical shaft, the first end surface being in axial abutment to the second gripping surface of said first rotatable positioning member and having disposed therein a plurality of linear channels which are reciprocal to the linear channels disposed in said second gripping surface and aligned therewith and having a receiving detent disposed therein adapted to receive the alignment pin; and (g) clamping means coupled to the cylindrical shaft adjacent the second end surface of said second rotatable positioning member and being adapted to impose an axial force against the second end surface of said second rotatable positioning member for securing the equipment support shaft between a reciprocal set of the linear channels of the first and second rotatable positioning members.

9. A grip head as defined in claim 8 wherein a cylindrical malleable member having planar surfaces in parallel spaced relation to each other is disposed about the cylindrical shaft intermediate the fixed positioning member and said first rotatable positioning member.

* * * * *